United States Patent

Martin et al.

[11] Patent Number: 5,850,469
[45] Date of Patent: Dec. 15, 1998

[54] REAL TIME TRACKING OF CAMERA POSE

[75] Inventors: Kenneth Morris Martin, Clifton Park; Nelson Raymond Corby, Jr., Scotia, both of N.Y.; Thomas Dean VerSchure, Cincinnati, Ohio

[73] Assignee: General Electric Company, Schenectady, N.Y.

[21] Appl. No.: 743,068

[22] Filed: Nov. 4, 1996

Related U.S. Application Data

[60] Provisional application No. 60/024,200 Jul. 9, 1996.
[51] Int. Cl.$^6$ .................................................... G06K 9/36
[52] U.S. Cl. ........................ 382/154; 382/291; 345/420; 345/421
[58] Field of Search ................................ 382/106, 152, 382/154, 285, 291; 348/42, 45, 46; 356/3, 12; 345/420, 421

[56] References Cited

U.S. PATENT DOCUMENTS

| | | | |
|---|---|---|---|
| 5,259,037 | 11/1993 | Plunk | 382/291 |
| 5,432,712 | 7/1995 | Chan | 364/514 R |
| 5,566,246 | 10/1996 | Rao | 382/154 |
| 5,606,627 | 2/1997 | Kuo | 382/154 |
| 5,699,444 | 12/1997 | Palm | 382/106 |

FOREIGN PATENT DOCUMENTS

| | | |
|---|---|---|
| 0005918 | 9/1979 | European Pat. Off. . |
| 2116000 | 3/1982 | United Kingdom . |
| 2237951 | 2/1990 | United Kingdom . |

OTHER PUBLICATIONS

"Sensitivity of the Pose Refinement Problem to Accurate Estimation of Camera Parameters" by Rakesh Kumar and Allen R. Hanson, IEEE, p. 365–369 Aug. 1990.

"Three–Dimensional Object Recognition From Single Two–Dimensional Images", by David G. Lowe, Artificial Intelligence, vol. 31 (1987) pp. 355, 362–367 no month.

"Object Recognition Using a Feature Search Strategy Generated from a 3–D Model", by Hoshinori Kuno, Yasukazu Okamoto, and Satoshi Okada, IEEE CH2934–8/90/0000/0626, pp. 626–635.

"Alignment by Maximization of Mutual Information", by Paul Viola and William Welles, III, IEEE 0–8186–7042, Aug. 1995, pp. 16–23.

"Machine Vision" by Ramesh Jain, Rangachar Kaster, Brian Schunk, McGraw–Hill, New York, NY (1995) pp. 169–176 no month given.

*Primary Examiner*—Christopher S. Kelley
*Attorney, Agent, or Firm*—Lawrence P. Zale; Marvin Snyder

[57] ABSTRACT

The present invention is a system for real time tracking of position and orientation, termed "pose", of a remote camera. While remote cameras have been used on a regular basis to inspect machinery for wear or damage, knowing the exact location of a camera is difficult. Off-line feature extraction is employed with on-line pose determination. The feature extraction precomputes features from a CAD model of the object visible in a selected set of views. The on-line pose determination starts from an initial pose estimate, determines the visible model features, projects them into a two-dimensional image coordinate system, matches each to the current camera image, and uses the differences between the predicted and matched feature positions in a gradient descent technique to iteratively refine the pose estimate. The on-line portion of the system is designed to execute at video frame rates, providing a continual indication of borescope tip pose.

6 Claims, 4 Drawing Sheets

REAL TIME TRACKING OF CAMERA POSE

BACKGROUND OF THE INVENTION

This is a provisional application Ser. No. 60/024,200 filed Jul. 9, 1996.

1. Field of the Invention

The present invention related to visual determination of position, and more specifically visual refinement of position within an object.

2. Description of Related Art

Typically there is a need to determine the position and orientation "pose" of a remote camera aperture. This is especially the case with the use of a borescope. A borescope is a flexible tube which allows an operator at one end to see structures at the other end of the tube. This can be constructed with coherent fiber bundles running the length of the tube, or a small video camera located at the tip of the borescope and a video monitor at the other end. Borescopes are typically a centimeter or less in diameter, a few meters long, and used to inspect inaccessible regions of objects. For example, when inspecting the internal structure of a jet engine for cracks or fatigue, small openings from the outside allow the borescope to be snaked into the engine without having to drop the engine from the plane. In such an inspection, it is often difficult for the inspector to know the exact borescope tip (aperture) location within the engine, making it difficult to identify the location of new cracks found or to return to previously identified trouble spots.

An approach for determining camera pose, described by Yoshinori Kuno, Yasukazu Okamoto, and Satoshi Okada in "Object Recognition Using a Feature Search Strategy Generated from a 3-D Model", pp. 626–635 IEEE CH2934-8/90/0000/0626 suffers from the problem of a small field of view, in which only a small portion of the object may be viewed at one time. Due to the large amount of similar repeated structures inside a jet engine, pose determination therefore difficult. Further, in the time required to perform high level structure recognition, the borescope may have moved too far for unique localization.

Work has also been done by Paul Viola and William Wells III described in "Alignment by Maximization of Mutual Information", pp. 16–23 IEEE 0-8186-7042, August 1995. This approach does not take advantage of feature locality and it is too slow since it does not use any preprocessed features.

Prior art methods match 3D object features with a set of 2D features extracted from a single image. In contrast, since parts must be inspected in real time, it is not possible to extract complicated image features and match these features as rapidly as needed.

Currently, there is a need for a system which accurately determines the location and orientation of a remote camera.

SUMMARY OF THE INVENTION

The present invention employs a computer model and live video to determine position and orientation "pose" of a camera aperture within a subject. From the computer model, local 3D edge features are determined in an off-line process. 3D edge element features, "edgel" features of the computer model are projected into 2D and compared to the pixel intensities of the live video image. The current pose estimate is used to restrict processing of 3D edgel features to those which may be seen by the camera aperture.

On-line, an iterative search along the projected edgel's normal direction to determine peak matches between the camera image and the projected image of edgels. This results in one or two dimensional offset error per projected edgel. The on-line matching is an iterative process continually adjusting the pose estimate.

OBJECTS OF THE INVENTION

It is an object of the present invention to provide a system which determines a position and orientation of a remote camera aperture within a subject by comparing an internal visual scene of the subject with features extracted from a computer generated model of the subject.

It is another object of the present invention to provide a real time internal inspection system.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawing in which:

DETAILED DESCRIPTION OF THE INVENTION

Figure 1:
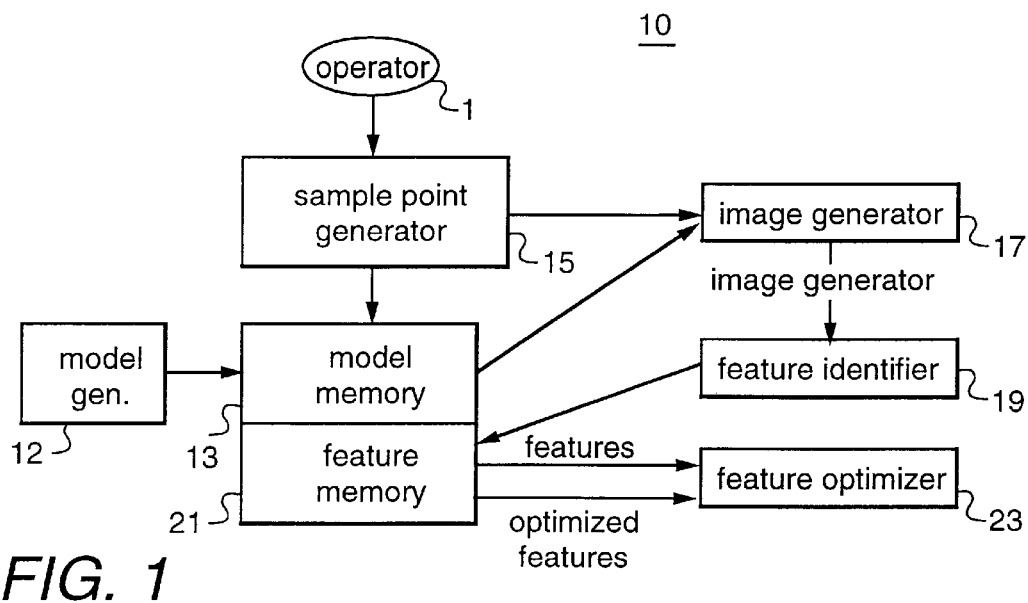
FIG. 1 is a simplified block diagram of the major components of feature extraction subsystem of the present invention.

The present invention employs two primary pieces: an off-line feature extraction subsystem 10 of FIG. 1, and an on-line pose determination subsystem 20. The system functions as summarized below.

Off-Line Feature Extraction Subsystem

The present invention requires a computer model of a subject to be inspected prestored in a model memory 13. A model generator 12 may also be used to generate a computer model. In one embodiment, model generator 12 may be a Computer Assisted Design (CAD) workstation producing a computer model of solid objects. In another embodiment, model generator 12 may be an X-ray, or magnetic resonance (MR) scanner coupled to a computer workstation which scans a subject to produce a computer model of structures of the subject, such as is common in medical imaging.

A sample point generator 15 reads the computer model from model memory 13 and generates a list of 3D sample points including internal cavities where an aperture of a camera or borescope could possibly travel. These points could be generated by sample point generator 15 either by a uniform, or non-uniform sampling of the 3D region, cavity, enclosed by the computer model.

At each sample point determined by sample point generator 15, an image generator 17 generates a collection of 2D images of the CAD model as viewed from that sample point.

Traditional computer graphics techniques can be used by image generator 17 to render six square images from the current sample point. Each image axis subtends ninety degrees and the combination of all six images forms a closed cube oriented along the three axes. The images are selected to ensure that the collected images completely enclose the selected sample point.

To obtain the best features possible, the specular and diffuse material properties of the computer model may be adjusted so that the computer rendered images from image generator 15 closely resemble video of the part currently being inspected. Material properties are selected for rendering that match the properties of the physical part.

For each image generated by image generator 17, a feature identifier 19 detects and extracts edges having large intensity gradients. Feature identifier 19 also identifies which edges are contiguous, or are close enough to identified as being from a single feature. Contiguous edges are referred to as an "edgel chain". Image generator 17 then selects a fixed size subset of edgel chains having the largest gradients. Typically thirty to fifty features are extracted with a minimum angular separation of three to five degrees relative to an axis through the center of the camera aperture. The edgel having the largest gradient is processed first with lower gradients processed later. Typically, that provides fifty features for each view, six views for each sample point and about one hundred sample points yielding approximately 30,000 features. This provides a good tradeoff between speed and accuracy.

The gradient direction of the selected edgels, and their 3D location are stored in a feature memory 21 which may be an independent element, or a partition of model memory 13.

Feature identifier 19 may also employ Gaussian smoothing, gradient calculation, non-maximal suppression, edgel chaining, and local quadratic sub-pixel positioning as described in "Machine Vision" by Ramesh Jain, Rangachar Kaster, Brian Schunk, pp. 169–176, McGraw-Hill, New York, N.Y. (1995).

In the preferred embodiment, a feature optimizer 23 can be added and used to re-sample the original space of the computer model, combining features from neighboring sample points of features stored in feature memory 21, removing redundant features, and storing the resulting set of features indexed by the location of a newly created sample point.

Feature optimization by feature optimizer 23 improves the system's on-line performance by eliminating redundant features. It takes each voxel of the selected points volume, combines the features for the eight vertices of the voxel, and removes redundant features. Feature optimizer 23 determines that two features are redundant by using the Euclidean distance between them and the angle between their gradient directions. If both of these values fall below predetermined thresholds, then one of the features is removed.

A side effect of this combining process is that an input volume of sample points with dimensions (N,N,N) reduces to a volume of (N−1,N−1,N−1).

On-line Pose Determination

By employing pre-computed features, avoiding the need for explicit feature extraction in the camera images, and iterative pose refinement, video rate pose determination can be achieved. An important feature of the present pose determination system is that the projected 3D features may either be matched exactly, giving a 2D position error vector, or be matched along the gradient direction, giving only a 1D component of position error along the gradient direction.

Figure 2:
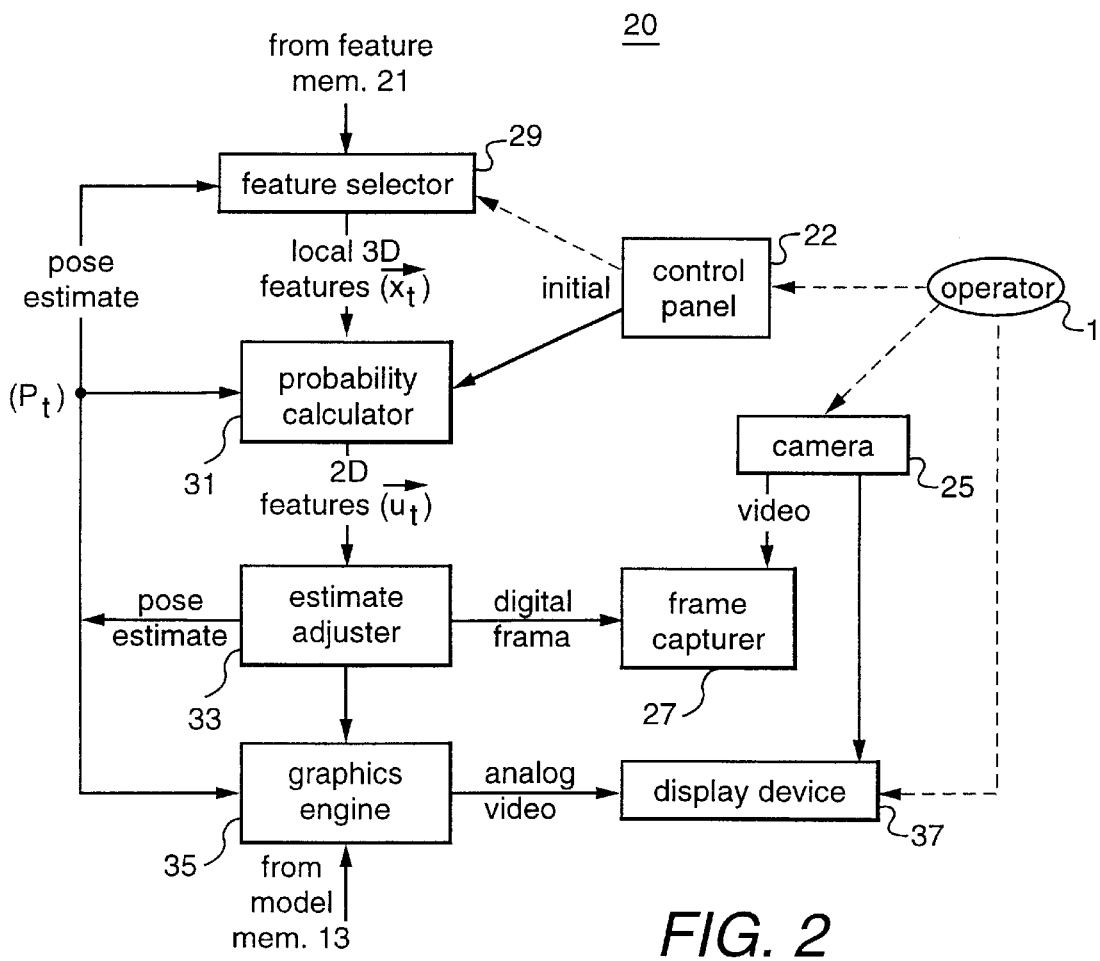
FIG. 2 is a simplified block diagram of the major components of an on-line pose determination subsystem of the present invention.

On-line pose determination subsystem 20 is depicted in FIG. 2. The subsystem includes a camera or a fiber optic device 25 which may be inserted into a subject to acquires live video of the inside of the subject from its aperture, or used to obtain live video of external surfaces of the subject. If the camera 25 employs fiber optics, its aperture is the end of the fiber optics and position and orientation are measured from the aperture. For the remainder of this specification, references to "camera position and orientation" or "pose estimate" will that of a camera aperture, or its functional aperture, which may be the end of an optical fiber.

A frame capturer 23 captures and digitizes a live video frame from camera 25.

A current pose estimate is passed to a feature selector 29. Initially this comes from operator 1 positioning the camera at a known location or landmark then indicating so to feature selector 29. Subsequently, it is taken from the results of the estimated pose for the previous camera image.

Feature selector 29 employs the current pose estimate (an initial estimate for the first one) to select the appropriate subset of the features, or optimized features, created during preprocessing. Feature selector 29 determines the 3D sample point closest to the current pose estimate. This is a very simple calculation to find the closest point in the structured volume. Feature selector 29 determines which features would be visible from the current sample point. Only the features that could be seen by the camera in its current sample point are selected. Since the features are 3D locations, this involves determining if they are in the view frustum of the camera. This set is restricted further to eliminate features near the edges of the view frustum by selecting an angle smaller than the view angle of camera 25.

A projection device 31 receives the current sample point. Projection device 31 projects the N 3D features selected by feature selector 29 onto the 2D image coordinate system defined by the current pose estimates.

An estimate adjuster 33 matches features of the 2D image to the captured digital frame, and refines the pose estimate based on position/orientation differences between the projected and digital frame feature positions.

Estimate adjuster 33 then employs the N error terms to update the camera pose estimate, which is fed back to feature selector 29 and projection device 31.

A display device 37 may optionally be connected to camera 25 and display live video from camera 25.

A graphics engine 35 is coupled to the model memory 13, the estimate adjuster 33, and display device 37 which receives the current pose estimate from estimate adjuster 33, and provides a computer rendered image of the computer model as viewed from the pose estimates. These may be displayed next to the live video such that operator 1 can view either, or both, of these images simultaneously.

Pose estimates may be displayed in numeric form on the display device 37, or graphics engine 35 may construct another reduced scale static image of a large portion of the subject which may be used as a map, with an icon superimposed upon the map indicating the estimated current camera aperture position and orientation.

Figure 3:
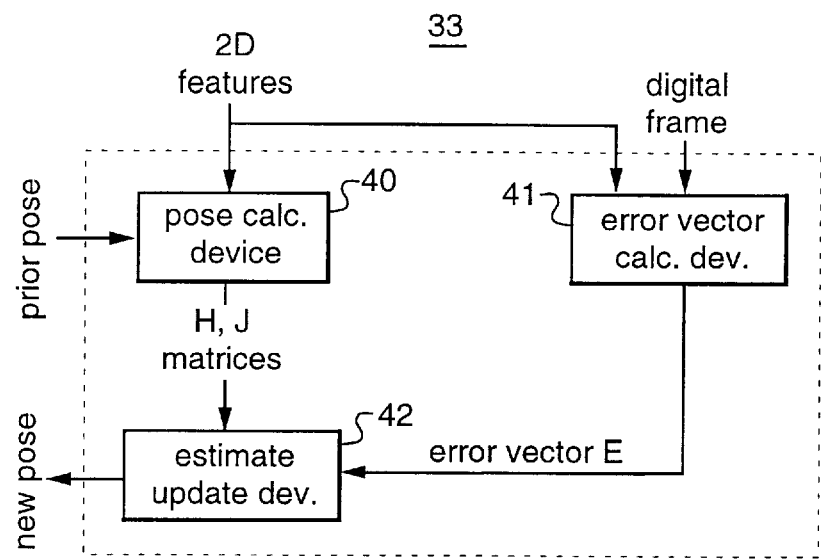
FIG. 3 is a more detailed block diagram of the estimate adjuster of FIG. 2, according to the present invention.
Figure 4:
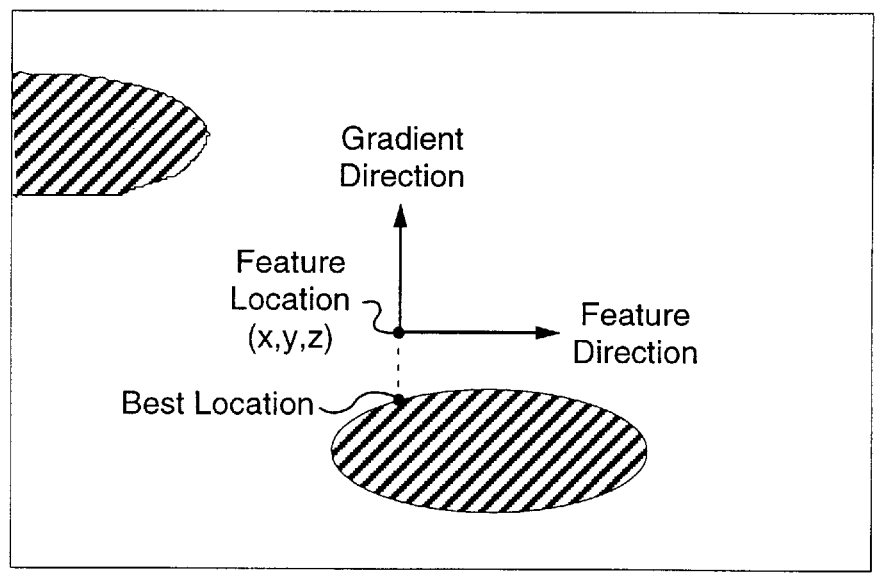
FIG. 4 illustrates how features are matched to a camera image.

FIG. 3 is a more detailed block diagram of the estimate adjuster of FIG. 2. An error vector calculation device 41 receives the digital frame and the 2D features and determines an error vector, $\vec{E}_r$.

A pose calculation device 40 receives the 2D features, either receives, or has stored the previous pose estimate, and produces matrices, to be described below H, and J which are provided to an estimate update device 42. Estim. update device 42 also receives the error vector $\vec{E}_r$ from error vector calc. device 41 and creates a new pose estimate. These elements are described in connection which the equations below.

Below is a more detailed description of the theory behind matching the features to the captured frame.

There are N 2D edge locations that are the image projections of the 3D features, and the current camera image. For each 2D location an initial matching step is performed between a one dimensional step function oriented along the edgel gradient, and the video at that location. This process is repeated at locations in the positive and negative edge gradient direction up to predefined maximum distance (for example, a nine pixels maximum distance worked well). The best correlation found is compared to a threshold (currently 0.5). If the correlation is higher than this, the difference between its location and the original location is used to form the error vector, which at this point is constrained along the gradient direction.

The initial matching step is restricted to image positions along the feature's gradient direction. Since the features only contain a location and a direction, there is nothing to limit tangential movement. Only if a correlation above the threshold is not found along the gradient direction, the search is extended to a second matching step which includes tangential displacements. For example, if the feature shown in FIG. 3, were moved to the left, eventually the gradient direction search would no longer intersect the edge it previously had. In this situation the lateral search can provide the necessary error vector. This is repeated independently for all N features, resulting in a vector for the overall local error.

Please note that each of the blocks of the block diagram may be implemented as analog or digital hardware, or as a combination of hardware running software which produces a similar function.

Theory

The features that only matched in one direction, the gradient direction, only provide a single constraint, the gradient distance to the best match. Other features which matched in both directions, provide two constraints. In deriving the camera pose estimate, the case where all the features matched in two directions is examined first, then this is extended to handle the case where some features matched in only a single direction.

Pose Derivation—First Case

The following are definitions:

$\vec{P}_t$=the 6D camera pose vector, location (x,y,z) and orientation (roll, pitch, yaw);

$\vec{u}_{it}$=the 2D image position $(u_{it}, v_{it})$ of feature i at iteration t;

$\vec{x}_{it}$=the 3D position $(x_{it}, y_{it}, z_{it})$ of feature i at iteration t; and $\vec{F}$=the camera projection function, specific to a particular camera's view frustum.

$\vec{F}$ is a simple perspective camera model. Starting from the equation for projecting a 3D feature into a 2D image:

$\vec{u}_{it} = \vec{F}(\vec{P}_t, \vec{x}_{it})$, is performed in pose calculation device 40.

An expression for the change in the feature's image coordinates based on changes in the camera pose can be derived as follows:

$\Delta \vec{u}_{it} = \vec{u}_{it} - \vec{u}_{i(t-1)}$, a change in position, $\Delta \vec{u}_{it} = \vec{F}(\vec{P}_{(t-1)} + \Delta \vec{P}, \vec{x}_i) - \vec{F}(\vec{P}_{t-1}, \vec{x}_i)$, caused by a change in pose, $\Delta \vec{u}_{it} = \vec{J}_i(\vec{P}_{(t-1)}, \vec{x}) \Delta \vec{P} + \text{H.O.T.}$, may be rewritten as this, where J(c) is the Jacobian function of (c), and H.O.T. refers to higher order terms.

Dropping the higher order terms, a constraint on the pose for each error vector is obtained. The constraints for all N>=3 matches can be combined to solve for the pose. First the $\Delta \vec{u}_{it}$ vectors are combined into a 2N error vector $\vec{E}_t$. Likewise the Jacobians, $J_i$, are combined into a 2N by 6 matrix J. Then, the pose error $\Delta \vec{P}_t$ may be determined by minimizing the following error norm:

$\|J\Delta \vec{P}_t - \vec{E}_t\|^2$ yielding $\Delta \vec{P}_t = (J^t J)^{-1} J^t \vec{E}_t$, where $\vec{E}_t$ is determined by error vector calculation device 41, and matrix J is from pose calculation device 40, both of FIG. 3.

The Jacobians can be computed by conventional means such as described by David G. Lowe "Three-Dimensional Object Recognition from Single Two-Dimensional Images", *Artificial Intelligence*, Vol. 31 (1987). The resulting $\Delta \vec{P}_t$ provides an error vector for the camera pose. The preceding technique may be used within a conventional gradient descent algorithm to determine the best match between the camera pose and the current video frame.

Pose Derivation—Second Case

The above derivation may be extended to handle the situation where some features are gradient features providing one constraint (their gradient displacement) and the others are position features providing two constraints. Starting with the equation for gradient displacement:

$\Delta d_{it} = \hat{g}^t \Delta \vec{u}_{it}$ where $\hat{g}$ is the unit gradient vector indicating the direction of the gradient. An error vector can be constructed:

$$\vec{E}_t = \begin{bmatrix} \Delta d_{it} \text{ for all } i \text{ that are gradient features} \\ \Delta \vec{u}_{it} \text{ for all } i \text{ that are position features} \end{bmatrix}.$$

Et is calculated by the error vector calculation device 41.

The error norm then becomes $\|HJ\Delta \vec{P}_t - \vec{E}_t\|^2$ where matrix H can be constructed as follows:

$$H = \begin{bmatrix} g_{1u} & g_{1v} & 0 & 0 & \ldots & 0 & 0 & 0 \\ 0 & 0 & g_{2u} & g_{2v} & \ldots & 0 & 0 & 0 \\ & & & & \ldots & & & \\ 0 & 0 & 0 & 0 & \ldots & 1 & 0 & 0 \\ 0 & 0 & 0 & 0 & \ldots & 0 & 1 & 0 \\ 0 & 0 & 0 & 0 & \ldots & 0 & 0 & 1 \end{bmatrix}.$$

If a is the number of gradient features then H will have a rows similar to the first two shown. These rows map 2D displacements into gradient displacements essentially by performing a dot product with the unit gradient. Likewise if b is the number of position features then the bottom right corner of H will be the 2b identity matrix. The resulting size of H will be a+2b by 2N. This can be solved in the same manner as before yielding:

$\Delta \vec{P}_t = \{(HJ)^t(HJ)\}^{-1}(HJ)^t \vec{E}_t$, where, again, $\vec{E}_t$ is from error vector calculation device 41, and matrices H, J are from pose calculation device 40, both of FIG. 3.

Experimental Results

The initial implementation of the present invention was developed on a UNIX platform. Based on our current performance, the on-line system is expected to be capable of handling thirty frames per second of NTSC video.

FIGS. 5–8 show the results of a thirty frame test sequence from a F110A jet engine exhaust duct. The duct is essentially a cylinder one meter in diameter, with a slightly smaller liner nested within it.

Figure 5:
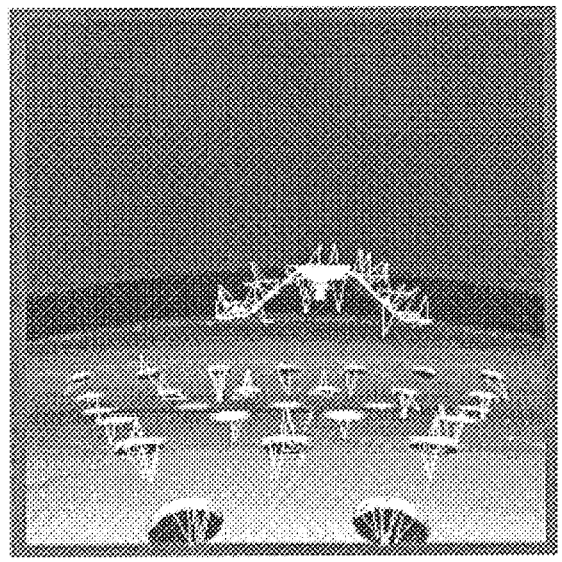
FIGS. 5 and 6 show frames of live video from a borescope overlaid with features shown as triangles.
Figure 6:
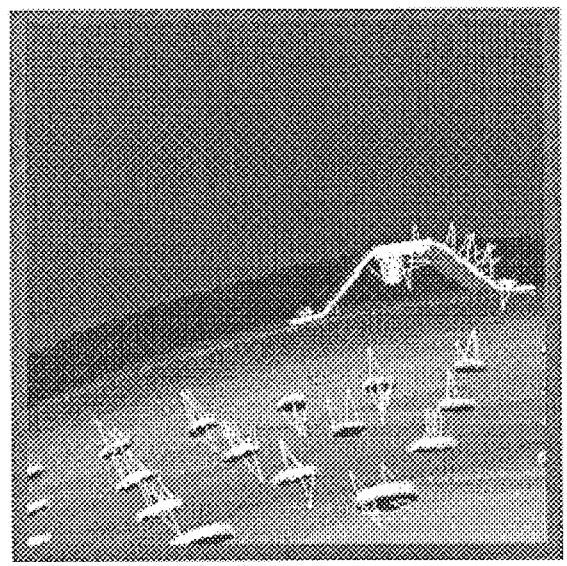

FIGS. 5 and 6 show individual frames of this sequence with the features overlaid as white triangles. Each feature is located at the center of the triangle's base and the triangle's direction indicates its current local gradient. The borescope inspection takes place in the two centimeter region between the undulated liner and the duct. The holes seen in FIGS. 5 and 6 are in the exhaust liner and are about half a centimeter in diameter. The bracket in the background holds the liner at about two centimeters from the duct. The test frames are computer renderings of the CAD model at specific locations and with appropriate camera and lighting parameters.

During the first ten frames the borescope is translated forward at a rate of 0.254 centimeters per frame. In the next ten frames it is translated to the left at the same rate. In the final ten frames the borescope is rolled at a rate of one degree per frame.

Figure 7:
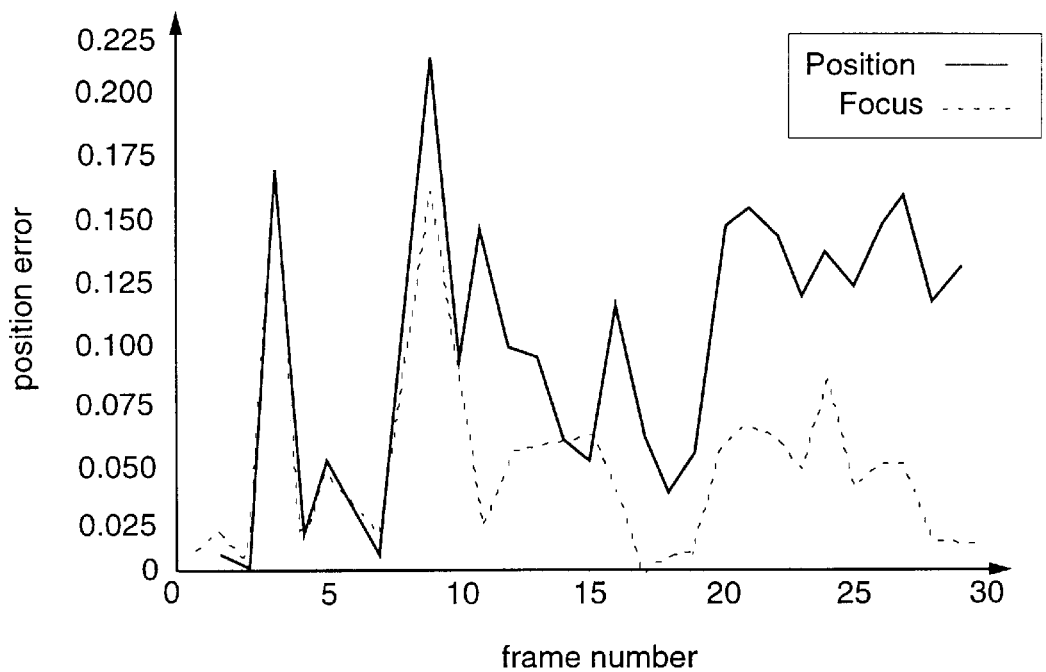
FIG. 7 is a graph of distance error vs. frame number.

FIG. 7 shows that the position error measurements are below 2.2 mm. throughout the thirty frames. More importantly, it shows that the error is not monotonically increasing indicating cumulative errors. The borescope's focal point (situated ten centimeters away) shows a similar close correspondence to the correct value.

Figure 8:
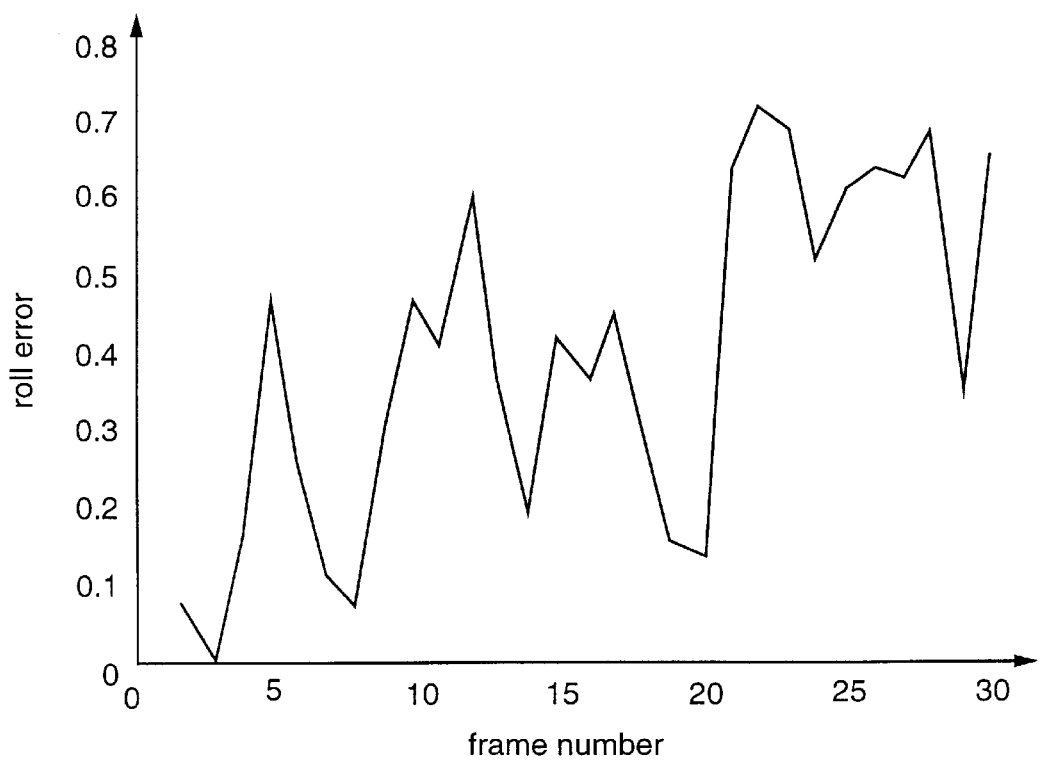
FIG. 8 is a graph of orientation error vs. frame number.

FIG. 8 shows that the error in roll is kept under 0.8 degrees throughout the run in which the total roll is ten degrees (all during the last ten frames).

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A system for determining a camera aperture position and orientation ("pose") within a subject comprising:
   a) a model memory having a prestored computer model of 3D structures of said subject;
   b) a sample point generator functioning to read the computer model, and create a plurality of sample points throughout the model;
   c) an image generator coupled to the sample point generator, which creates images of the 3D model structures as viewed from the sample point for a plurality of orientation angles, and for the plurality of sample points;
   d) a feature memory capable of storing information provided to it;
   e) a feature identifier for receiving images from the image generator, and identifying intensity gradients and their corresponding locations in the images, identifying which gradients are contiguous, and storing a plurality of the largest gradients, and their corresponding locations as features in the feature memory;
   f) an on-line pose determination subsystem, coupled to the feature memory, for acquiring live image frame of said subject, receiving selected features from the feature memory, and comparing the features to the live image frame to determine said adjusted camera aperture pose.

2. The system for determining a camera aperture position and orientation of claim 1 further comprising a model generator for creating a computer model of said subject, and for storing this model in the computer model memory.

3. The system for determining a camera aperture position and orientation of claim 1 further comprising a feature optimizer for removing from feature memory, similar, redundant, features being less than a predetermined distance apart.

4. The system for determining a camera aperture position and orientation of claim 1 wherein the on-line pose determination subsystem comprising:
   a) an operator-positionable camera having an aperture, for acquiring live images as viewed from its aperture;
   b) a feature selector, for receiving manual input for the initial position and orientation ("pose") of the camera aperture, and for receiving subsequent automated pose estimates, functioning to select features within a predetermined view frustum of the camera at its current estimated pose;
   c) projection device coupled to the feature selector for receiving the selected features and for projecting them into a projected 2D image as viewed from the current estimated pose;
   d) a frame capturer coupled to the camera, for selecting a single digital image frame at a time from the camera;
   e) an estimate adjuster coupled to the projection device and the frame capturer for iteratively correlating the projected 2D image with the digital frame, moving the projected 2D image relative to the digital frame to determine an error offset vector, and updating the current pose estimate with the error offset vector to produce a new current pose estimate which is provided to the feature selector and the projection device for further processing.

5. The system for determining a camera aperture position and orientation of claim 1 further comprising a display device coupled to the model memory, the camera and the estimate adjuster, for receiving the initial and current pose estimates, providing a computer graphic display of the computer model as viewed from the pose estimates, and displaying the camera live video.

6. The system for determining a camera aperture position and orientation of claim 1 further comprising a manual control panel capable of accepting manual input from an operator and providing it to the feature selector, the projection device and the display device.

* * * * *